United States Patent
Zhang et al.

(10) Patent No.: US 10,437,461 B2
(45) Date of Patent: Oct. 8, 2019

(54) PRESENTATION OF REPRESENTATION OF HANDWRITING INPUT ON DISPLAY

(71) Applicant: Lenovo (Singapore) Pte. Ltd., New Tech Park (SG)

(72) Inventors: Jianbang Zhang, Cary, NC (US); Song Wang, Wake, NC (US); Bradley Park Strazisar, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 962 days.

(21) Appl. No.: 14/601,522

(22) Filed: Jan. 21, 2015

(65) Prior Publication Data
US 2016/0210037 A1 Jul. 21, 2016

(51) Int. Cl.
*G06F 3/0488* (2013.01)
*G06F 3/0481* (2013.01)
(Continued)

(52) U.S. Cl.
CPC ........ *G06F 3/04883* (2013.01); *G06F 3/0481* (2013.01); *G06F 3/04845* (2013.01); *H04L 67/10* (2013.01)

(58) Field of Classification Search
CPC .............. G06F 3/0354; G06F 3/04883; G06F 3/04845; G06F 3/0481; G06F 3/0488
See application file for complete search history.

(56) References Cited

U.S. PATENT DOCUMENTS

| | | | | |
|---|---|---|---|---|
| 5,698,822 A | * | 12/1997 | Haneda | G06F 3/04883 178/18.01 |
| 5,864,636 A | * | 1/1999 | Chisaka | G06K 9/00416 345/179 |
| 2003/0214490 A1 | | 11/2003 | Cool | |
| 2005/0135678 A1 | * | 6/2005 | Wecker | G06F 3/04883 382/186 |

(Continued)

FOREIGN PATENT DOCUMENTS

| CN | 1637686 A | 7/2005 |
|---|---|---|
| CN | 101110006 A | 1/2008 |

(Continued)

OTHER PUBLICATIONS

Jianbang Zhang, John Weldon Nicholson, Scott Edwards Kelso, Steven Richard Perrin, "Presentation of Representations of Input with Contours Having a Width Based on the Size of the Input", related pending U.S. Appl. No. 14/294,646, Applicant's response to final office action filed Jul. 19, 2016.

(Continued)

*Primary Examiner* — Andrea C Leggett
(74) *Attorney, Agent, or Firm* — John L. Rogitz; John M. Rogitz (57) ABSTRACT

In one aspect, a device instructions executable by a processor to present, on a touch-enabled display at a first location, a first representation of at least a portion of first handwriting input. The instructions are executable to identify at least a first characteristic related to the first handwriting input, receive first input pertaining to second handwriting input, (Continued)

and in response to receipt of the first input, present on the touch-enabled display at a second location a second representation of at least a portion of the second handwriting input. The instructions are executable to receive second input to present at least a portion of the second representation at least adjacent to the first location and, in response to receipt of the second input and without receiving further input from a user, present at least the portion of the second representation at least adjacent to the first location using the first characteristic.

20 Claims, 6 Drawing Sheets

(51) Int. Cl.
*G06F 3/0484* (2013.01)
*H04L 29/08* (2006.01)

(56) References Cited

U.S. PATENT DOCUMENTS

| | | |
|---|---|---|
| 2005/0237311 A1 | 10/2005 | Nakajima |
| 2008/0030425 A1 | 2/2008 | Fullerton et al. |
| 2008/0079757 A1 | 4/2008 | Hochmuth |
| 2009/0021530 A1 | 1/2009 | Ishiguro |
| 2010/0231522 A1 | 9/2010 | Li |
| 2011/0060627 A1 | 3/2011 | Piersol et al. |
| 2012/0212440 A1 | 8/2012 | Nishida et al. |
| 2012/0242571 A1 | 9/2012 | Takamura et al. |
| 2012/0306766 A1 | 12/2012 | Moore |
| 2013/0027614 A1 | 1/2013 | Bayer et al. |
| 2013/0136377 A1 | 5/2013 | Luo et al. |
| 2013/0239046 A1 | 9/2013 | Platzer et al. |
| 2014/0068495 A1 | 3/2014 | He et al. |
| 2014/0184542 A1 | 7/2014 | Mao et al. |
| 2015/0091947 A1 | 4/2015 | Rakow et al. |
| 2015/0121207 A1 | 4/2015 | Shuler et al. |
| 2015/0169212 A1 | 6/2015 | Chang et al. |
| 2015/0346996 A1 | 12/2015 | Ogawa et al. |

FOREIGN PATENT DOCUMENTS

| | | |
|---|---|---|
| CN | 101539822 A | 9/2009 |
| EP | 2787450 A2 | 10/2014 |
| EP | 3048520 A1 | 7/2016 |

OTHER PUBLICATIONS

Jianbang Zhang, John Weldon Nicholson, Scott Edwards Kelso, Steven Richard Perrin, "Presentation of Representations of Input with Contours Having a Width Based on the Size of the Input", related U.S. Appl. No. 14/294,646, Applicant's response to Non-Final Office Action filed Mar. 2, 2016.

Anonymous, "Adobe Creative Cloud—Wikipedia, the free encyclopedia", (Jan. 20, 2015), URL: https://en.wikipedia.org/w/index.php?title=Adobe_Creative_Cloud&oldid=643395717, (May 23, 2016), XP055274623 [A] 19 * the whole document *.

Jianbang Zhang, Song Wang, Bradley Park Strazisar, "Presentation of Representation of Handwriting Input on Display", related U.S. Appl. No. 14/294,646, Applicant's response to Non-Final Office Action filed Mar. 22, 2017.

Jianbang Zhang, John Weldon Nicholson, Scott Edwards Kelso, Steven Richard Perrin, "Presentation of Representations of Input with Contours Having a Width Based on the Size of the Input", related U.S. Appl. No. 14/294,646, Final Office Action dated May 10, 2017.

Jianbang Zhang, John Weldon Nicholson, Scott Edwards Kelso, Steven Richard Perrin, "Presentation of Representations of Input with Contours Having a Width Based on the Size of the Input", related U.S. Appl. No. 14/294,646, Non-Final Office Action dated Feb. 5, 2016.

Jianbang Zhang, John Weldon Nicholson, Scott Edwards Kelso, Steven Richard Perrin, "Presentation of Representations of Input with Contours Having a Width Based on the Size of the Input" related pending U.S. Appl. No. 14/294,646, filed Jun. 3, 2014.

Jianbang Zhang, John Weldon Nicholson, Scott Edwards Kelso, Steven Richard Perrin, "Presentation of Representations of Input with Contours Having a Width Based on the Size of the Input", related U.S. Appl. No. 14/294,646, Final Office Action dated Apr. 19, 2016.

Jianbang Zhang, John Weldon Nicholson, Scott Edwards Kelso, Steven Richard Perrin, "Presentation of Representations of Input with Contours Having a Width Based on the Size of the Input", related U.S. Appl. No. 14/294,646, Non-Final Office Action dated Jan. 5, 2017.

Jianbang Zhang, John Weldon Nicholson, Scott Edwards Kelso, Steven Richard Perrin, "Presentation of Representations of Input with Contours Having a Width Based on the Size of the Input", related U.S. Appl. No. 14/294,646, Applicant's response to Final Office Action filed Aug. 8, 2017.

Jianbang Zhang, John Weldon Nicholson, Scott Edwards Kelso, Steven Richard Perrin, "Presentation of Representations of Input with Contours Having a Width Based on the Size of the Input", related U.S. Appl. No. 14/294,646, Non-Final Office Action dated Aug. 30, 2017.

Jianbang Zhang, John Weldon Nicholson, Scott Edwards Kelso, Steven Richard Perrin, "Presentation of Representations of Input with Contours Having a Width Based on the Size of the Input", related pending U.S. Appl. No. 14/294,646, Applicant's response to non-final office action filed Nov. 8, 2017.

Jianbang Zhang, John Weldon Nicholson, Scott Edwards Kelso, Steven Richard Perrin, "Presentation of Representations of Input With Contours Having a Width Based on the Size of the Input", related U.S. Appl. No. 14/601,522, Final Office Action dated Oct. 9, 2018.

Jianbang Zhang, John Nicholson, Scott Kelso, Steven Perrin, "Presentation of Representations of Input with Contours Having a Width Based on the Size of the Input", related U.S. Appl. No. 14/294,646, Non-Final Office Action dated May 31, 2018.

Jianbang Zhang, John Weldon Nicholson, Scott Edwards Kelso, Steven Richard Perrin, "Presentation of Representations of Input with Contours Having a Width Based on the Size of the Input", related U.S. Appl. No. 14/294,646, Final Office Action dated Dec. 18, 2017.

Jianbang Zhang, John Weldon Nicholson, Scott Edwards Kelso, Steven Richard Perrin, "Presentation of Representations of Input with Contours Having a Width Based on the Size of the Input", related U.S. Appl. No. 14/294,646, Applicant's response to Final Office Action filed Apr. 6, 2018.

Jianbang Zhang, John Weldon Nicholson, Scott Edwards Kelso, Steven Richard Perrin, "Presentation of Representations of Input with Contours Having a Width Based on the Size of the Input", related U.S. Appl. No. 14/294,646, Non-Final Office Action dated Mar. 22, 2019.

Jianbang Zhang, John Weldon Nicholson, Scott Edwards Kelso, Steven Richard Perrin, "Presentation of Representations of Input with Contours Having a Width Based on the Size of the Input", related U.S. Appl. No. 14/294,646, Applicant's response to Non-Final Office Action filed Apr. 15, 2019.

Jianbang Zhang, John Weldon Nicholson, Scott Edwards Kelso, Steven Richard Perrin, "Presentation of Representations of Input With Contours Having a Width Based on the Size of the Input", related U.S. Appl. No. 14/294,646, Final Office Action dated Oct. 9, 2018.

Jianbang Zhang, John Weldon Nicholson, Scott Edwards Kelso, Steven Richard Perrin, "Presentation of Representations of Input With Contours Having a Width Based on the Size of the Input", related U.S. Appl. No. 14/294,646, Applicant's response to Final Office Action filed Jan. 9, 2019.

Jianbang Zhang, John Weldon Nicholson, Scott Edwards Kelso, Steven Richard Perrin, "Presentation of Representations of Input (56) References Cited

OTHER PUBLICATIONS with Contours Having a Width Based on the Size of the Input", related U.S. Appl. No. 14/294,646, Applicant's response to the Non-Final Office Action filed Aug. 27, 2018.

* cited by examiner

PRESENTATION OF REPRESENTATION OF HANDWRITING INPUT ON DISPLAY

I. FIELD

The present application relates generally to presenting representations of handwriting input on a display.

II. BACKGROUND

As recognized herein, when e.g. cutting and pasting a representation of handwriting input from one location on a display to another one at which another representation of handwriting input is presented, the pasted representation often looks odd compared to the other representation owing to e.g. varying sizes of the representations. This is not desirable when the user intended to paste the representation into or next to the other representation to form or amend a phrase or sentence using both representations, and hence intended to have all portions of the phrase or sentence look relatively the same.

SUMMARY

Accordingly, in one aspect a device includes a processor, a touch-enabled display accessible to the processor, and a memory accessible to the processor. The memory bears instructions executable by the processor to present, on the touch-enabled display at a first location, a first representation of at least a portion of first handwriting input. The instructions are also executable to identify at least a first characteristic related to the first handwriting input, receive first input pertaining to second handwriting input, and in response to receipt of the first input, present on the touch-enabled display at a second location a second representation of at least a portion of the second handwriting input. The instructions are further executable to receive second input to present at least a portion of the second representation at least adjacent to the first location and, in response to receipt of the second input and without receiving further input from a user, present at least the portion of the second representation at least adjacent to the first location using the first characteristic.

In another aspect, a method includes presenting, in a first instance, a first representation of first handwriting input on a display. The method also includes presenting a second representation of second handwriting input on the display, receiving a first command selecting at least a portion of the first representation, and receiving a second command to present at least the portion of the first representation at an area on the display at least adjacent to presentation of the second representation. The method further includes presenting, in a second instance, at least the portion of the first representation at the area differently in at least one aspect than at least the portion of the first representation was presented in the first instance at least in part by altering at least one aspect of presentation of at least the portion of the first representation based on the presentation of the second representation.

In still another aspect, an apparatus includes a first processor, a network adapter, and storage bearing instructions executable by a second processor for presenting at least a first representation of handwriting input on a display and presenting at least a second representation of handwriting input on the display. The instructions are also executable for receiving a command to insert at least a portion of the second representation of handwriting input into a portion of the first representation, inserting at least the portion of the second representation into the portion of the first representation and adjusting the portion of the second representation to appear at least similar to the appearance of the first representation in at least one respect. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
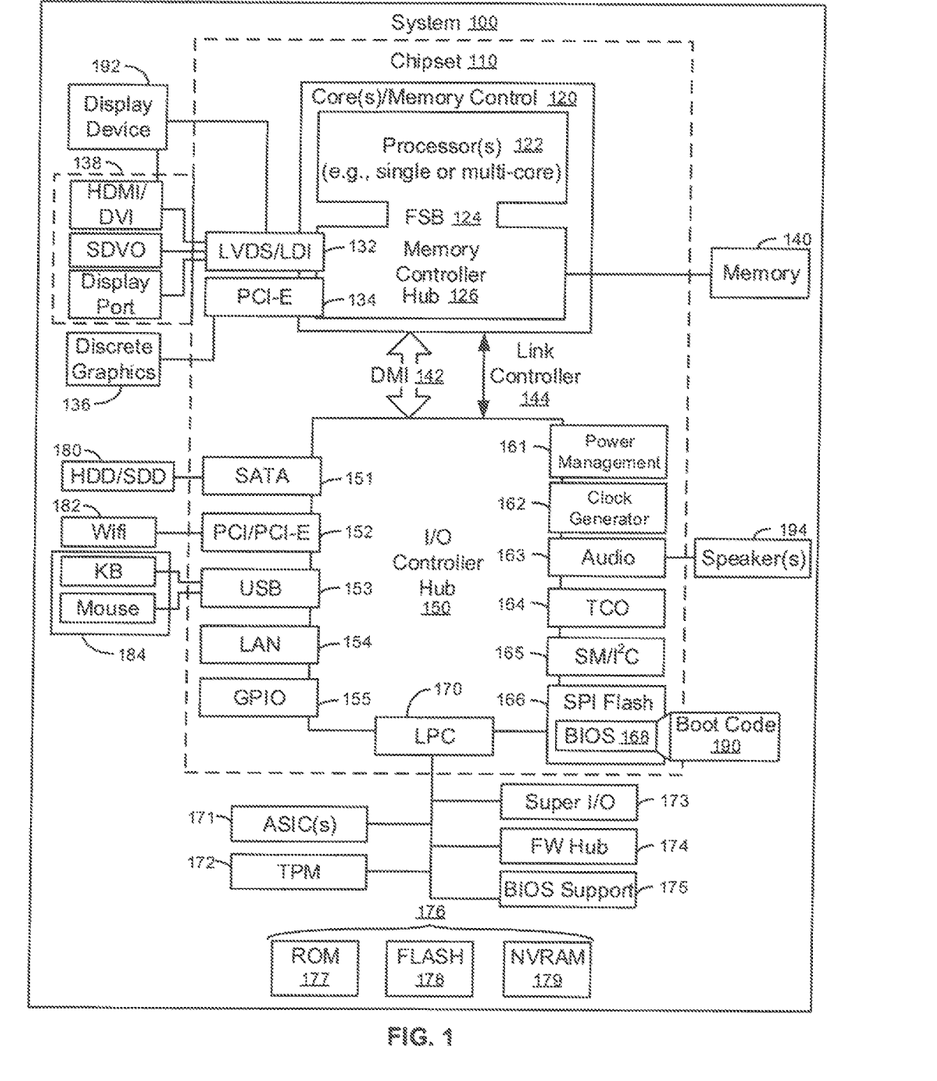
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video. HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, an audio receiver/microphone providing input to the processor 122 e.g. based on a user providing audible input to the microphone, and a camera for gathering one or more images and providing input related thereto to the processor 122. The camera may be, e.g., a thermal imaging camera, a digital camera such as a webcam, and/or a camera integrated into the system 100 and controllable by the processor 122 to gather pictures/images and/or video. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
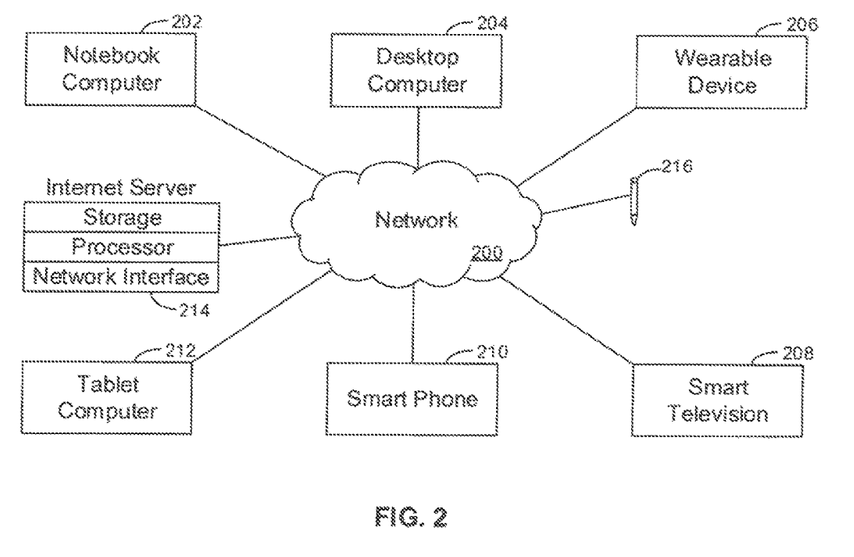
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, a stylus and/or electronic pen 216 configured for providing input to a touch-enabled display such as the display 192 discussed above, and a server 214 such as e.g. an Internet server that may e.g. provide cloud storage accessible to the devices 202-212 and 216. It is to be understood that the devices 202-216 are configured to communicate with each other over the network 200 to undertake present principles.

Figure 3:
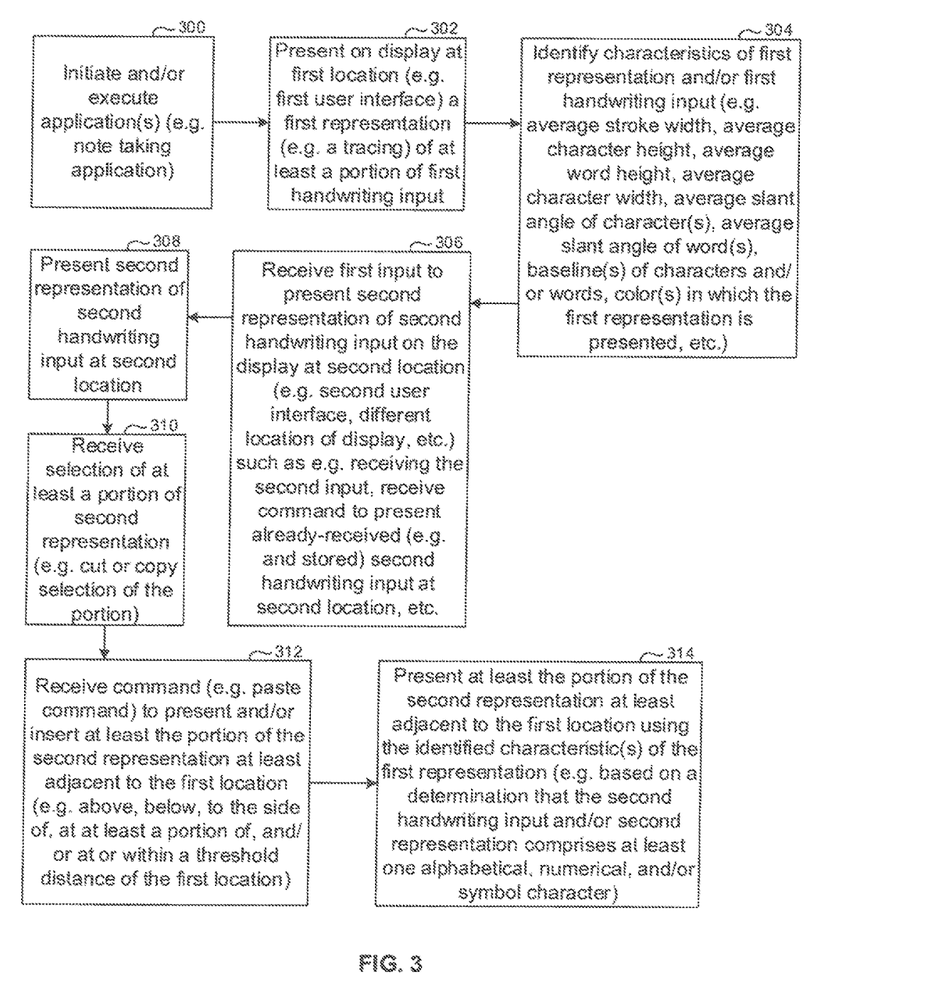
FIG. 3 is a flow chart showing an example algorithm in accordance with present principles.

Referring to FIG. 3, it shows example logic that may be undertaken by a device such as the system 100 in accordance with present principles (referred to in reference to FIG. 3 as the "present device"). Beginning at block 300, the logic initiates and/or executes one or more applications for undertaking present principles, such as e.g. one or more note taking applications, drawing applications, word processing applications, Internet browser applications, etc. The logic then proceeds to block 302, where the logic presents at a first location on a touch-enabled display accessible to the present device a first representation of at least a portion of first handwriting input that was e.g. requested from storage by a user to be presented on the display and/or provided by a user by e.g. handwriting using a stylus and/or a portion of the user's body (e.g. their linger) against the surface of the touch-enabled display.

Note that the first location may be a location on a user interface (UI) presented on the display and/or a physical location on the display itself. Also note that a representation of handwriting input may comprise e.g. a tracing of handwriting input from a user as identified by the present device, and/or e.g. a representation of the handwriting input that includes the characters provided in the handwriting input but where those characters have been altered in at least one respect from how they were received based on the first handwriting input to the display but are still not presented as e.g. typeface text and/or typeface font.

In any case, after block 302 the logic moves to block 304, where the logic identifies one or more characteristics of the first representation and/or first handwriting input itself. For instance, one or more characteristics that may be identified include averages (e.g. mean, median, and/or mode) of stroke width of one or more strokes (e.g. contours, lines and/or curves at least in part establishing a character) of the first handwriting input and/or the first representation (e.g. strokes establishing the characters of the handwriting input and/or first representation), averages of character height of characters of the first handwriting input and/or the first representation, averages of word height of words of the first handwriting input and/or the first representation, averages of character width of characters of the first handwriting input and/or the first representation, averages of word width of words of the first handwriting input and/or the first representation, averages of areas respective characters of the first handwriting input and/or the first representation occupy, averages of areas respective words of the first handwriting input and/or the first representation occupy, averages of slant angle(s) of strokes of the first handwriting input and/or the first representation, averages of slant angle(s) of characters of the first handwriting input and/or the first representation, averages of slant angle(s) of words of the first handwriting input and/or the first representation, a baseline(s) established by characters of the first handwriting input and/or the first representation, a baseline(s) established by words of the first handwriting input and/or the first representation, one or more colors in which the first representation is presented (e.g. a color other than black, gray, or white), average distance between two characters (e.g. of the same word), average distance between two words, etc.

As understood herein, a baseline may be e.g. a horizontal line (e.g. relative to viewing the display upright) that is established based on the average location of the bottom-most parts of characters and/or words of the first handwriting input and/or first representation, e.g. where such an average may exclude and/or disregard characters having descenders such as e.g. a lower case letters "p", "g", "y", or "q". Descenders may be identified by the present device based on e.g. identification of the character itself and whether it is in lowercase or uppercase form (e.g. identification of a lowercase form of a particular character as being of a character type having a descender), and/or identified based on identification of a stroke as being a descender on the basis of the stroke descending an (e.g. threshold) amount more than other characters (e.g. a majority of other characters, and/or characters to the left and right of the subject character having the descending stroke). However, note that in other embodiments, the average establishing the baseline may account for characters having descenders.

Still in reference to FIG. 3, after block 304 the logic moves to block 306 where the logic receives first input to present a second representation of the second handwriting input on the display at a second location. The second location may be e.g. a location on a UI different from the UI described above in reference to block 302, a different location on the same UI, and/or may be a physical location on the display itself different from another physical location described.

Thus, it is to be understood that in some embodiments in accordance with present principles, different locations for different UIs may still be presented at the same and/or proximate locations on the display itself (e.g. at different times) and thus the portions of the touch-enabled display presenting the different UIs are not necessarily mutually exclusive. However, also note that in other embodiments in accordance with present principles, different locations may pertain to different physical locations of the display itself and thus be mutually exclusive.

Still in reference to block 306, note that the first input received thereat may include e.g. receiving the second handwriting input to the display at the second location, and/or receiving a command to present at the second location a representation of already-received second handwriting input that has been stored on a storage medium of the present device and/or another device (e.g. cloud storage). Regardless, responsive to receipt of the first input at block 306, the logic moves to block 308 where the logic presents (e.g. in a first instance) a second representation of the second handwriting input at the second location. Thereafter the logic moves to block 310 where the logic receives a selection (e.g. a cut or copy selection) of at least a portion of the second representation.

After block 310 the logic moves to block 312, where the logic receives a command (e.g. a paste command, a move command, etc.) to present and/or insert at least the portion of the second representation selected at block 310 at least adjacent to the first location and/or the presentation of the first representation. In non-limiting embodiments, adjacent may include at least one of above the first location, below the first location, to a side of the first location, at at least a portion of the first location, and/or within a threshold distance of the first location (e.g. a threshold distance above and to the right relative to looking at the display). However, also note that in some embodiments, e.g. when a user selects at least the portion of the second representation from a first UI, removes the first UI from the display, causes a second, different UI to be presented on the display, and then provides the command to present at least the portion on the second UI, "adjacent" may be any physical location of the display presenting the second UI.

Still in reference to FIG. 3, after block 312, the logic proceeds to block 314 where the logic (e.g. without any additional input from a user subsequent to issuance of the command received at block 312) presents (e.g. in a second instance later in time than the first instance) at least the portion of the second representation at least adjacent to the first location using the characteristic(s) of the first representation and/or first handwriting input identified at block 304 so that at least the portion of the second representation appears at least adjacent to the first location at least (e.g. substantially) similar in at least one aspect (e.g. stroke width or representation color) as the same respective aspect of the first representation. Furthermore, note that in some embodiments, e.g. at least the portion of the second representation presented at least adjacent to the first location is presented using the characteristic(s) of the first representation and/or first handwriting input responsive to a determination that the portion of the second representation comprises at least one numerical character (e.g., in Arabic numerals, a number from zero to nine), alphabetical character (e.g. in the English alphabet, a letter from A to Z, it being also understood that characters of other languages and/or alphabets such as Japanese and Chinese alphabets may be determined as well), and/or symbol character (e.g., a dollar sign ($), a percentage symbol (%), a parenthesis symbol ((and/or)), a pound sign (#), etc., it being also understood that symbols of other languages such as Japanese and Chinese symbols may be determined as well) e.g. as identified by the present device by executing character and/or text recognition software thereon.

Thus, e.g. should a user be attempting to paste a representation of drawing or doodle at the second location, the representation of the drawing would not be altered when presented at the second location based on the identified characteristics but would still e.g. be presented the same or at least substantially similar as it was at the first location (e.g. save for resolution and/or scaling changes that would otherwise occur). However, should the user be attempting to paste a representation of handwriting at the second location, the present device may identify it as such and responsive thereto present at least the portion of the representation at the second location using the identified characteristics of another representation presented thereat.

Figure 4:
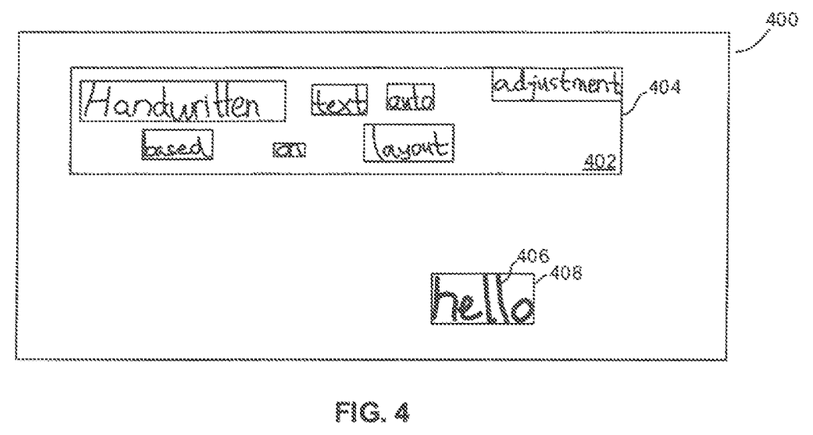
FIGS. 4-9 are example illustrations in accordance with present principles.

Continuing the detailed description in reference to FIG. 4, it shows an example handwriting application user interface (UI) 400 in accordance with present principles, including a first location 402 encompassed by example box 404 that is understood to be for illustration to show the bounds of the first location and may not actually be presented on the UI 400. Note that each representation of a handwritten word within the box 404 has characters of at least substantially the same stroke width as other characters and/or handwritten words therein.

Also, note that example boxes are shown surrounding individual word representations within the box 404, where these boxes may be defined by e.g. the upper-most, lower-most, left-most, and right-most portions of the UI and/or display to which respective portions of the representation of each word extend (e.g. where these respective portions may at least in part respectively establish and/or be used to identify average word heights, average word widths, and/or average word areas such as the ones described above in reference to block 304 above). Further, it is to be understood that the example boxes that are shown surrounding respective words of the word representations within the box 404 are, like the box 404 itself, for illustration and may not actually be presented on the UI 400.

In any case, and as also shown FIG. 4, the UI 400 includes a representation 406 of handwriting input of the word "hello" surrounded by a box 408, which is presented on a location of the display presenting the UI 400 which is physically different on the display from the first location. The box 408 is understood to at least in part establish the location of the representation 406 and is understood to be similar in configuration to the boxes surrounding the respective representations of handwritten words inside the first location (e.g. shown in example FIG. 4 for illustration and defined by the upper-most, lower-most, left-most, and right-most portions of the UI and/or display to which respective portions of the representation of the handwritten word "hello" extend). Furthermore, as may be appreciated from FIG. 4, the stroke width of the representation 406 is greater (e.g. at least twice as wide) as any representation of a handwritten character within the location 402 (e.g. owing to the user pressing a stylus down harder against the surface of the display when providing the handwritten input for the word "hello", owing to using a stylus with a relatively wider input tip than a different stylus used to input the words in the location 402, etc.).

Figure 5:
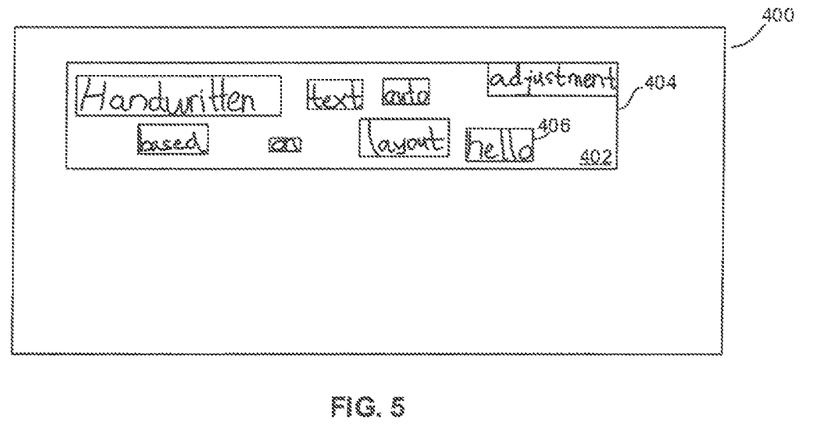

Now in reference to FIG. 5, the UI 400 is again shown, but with the representation 406 now presented in the location 402 (e.g. responsive to being selected from its location as shown in FIG. 4 and receipt of an insert command to insert it into a particular position of the location 402), to the right of the handwritten word "layout" and below the word "auto". Furthermore, note that as shown in FIG. 5, the representation 406 has been altered to have at least substantially the same stroke width as the other representations in the location 402 in accordance with present principles, and to have a size of characters (e.g. height and width of the characters of the word) at least substantially the same as the other representations in the location 402. However, and although not shown in FIG. 5 owing the present figure only showing colors in black, white, and gray, it is to be understood that (e.g. per a user setting), color of the representation of the word "hello" (e.g. green) has not been matched to the color of the other representations presented at the location 402 (e.g. red).

Figure 6:
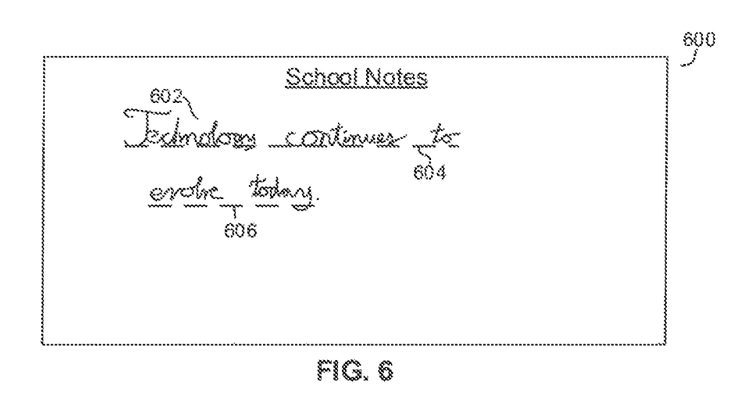

Now in reference to FIG. 6, it shows an example note taking UI 600 for a note taking application, including a representation 602 of handwriting of the phrase "Technology continues to evolve today." Note that perforated baselines 604 and 606 respectively for at least two different lines are shown, it being understood that that the baselines 604 and 606 are shown in FIG. 6 for illustration and that they may not actually be presented on the UI 600 (although in other embodiments they may be). Regardless, it is to also be understood that the baselines 604 and 606 themselves may have been determined and/or identified by the device presenting the UI 600 for use by the device to insert other representations of handwriting input adjacent to the representation 602 with bottom portions of the insertions e.g. abutting one or more of such baselines in accordance with present principles.

Figure 7:
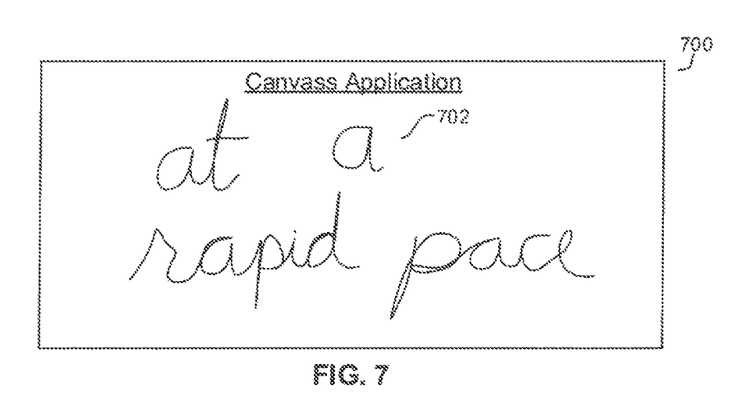

FIG. 7 shows an example canvass and/or drawing application UI 700 (e.g. presented on the same display as the UI 600 but produced from a different application) including a representation 702 of handwriting of the phrase "at a rapid pace". Though not explicitly shown in FIG. 7, it is to be understood that the representation 702 has been selected by a user, and turning the reader's attention to FIG. 8, been pasted into the UI 600 at the location of the representation 602 between characters, and in this case, words of the representation 602 as it previously appeared (between the representation of the word "evolve" and the representation of the word "at").

Figure 8:
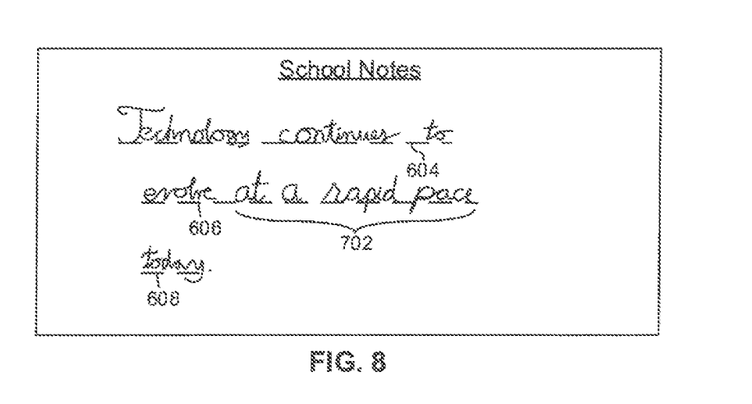

Contrasting the representation 702 of handwriting of the phrase "at a rapid pace" as shown in FIGS. 7 and 8, note that the characters and indeed the words of the representation 702 as shown in FIG. 7 have a greater slant angle relative to at least one vertical dimension of the UIs (e.g. a vertical axis established by and/or extending through a given stroke of a character) than they do when altered and presented as shown in FIG. 8 in accordance with present principles (e.g. the characters and the words appear more upright). Also note that the representation 702 as shown in FIG. 8 has been presented along the baseline 606, and that the representation of the word "today" has been moved down to an additional line owing to insertion of the representation 702, thus establishing another baseline 608.

Still further, it may be appreciated from FIG. 8 that the height and width of the handwritten characters (e.g. individual letters) in the representation 702 have been altered to be smaller in FIG. 8 than they were as presented in FIG. 7 (e.g. where in FIG. 7 the representation 702 traced at least substantially the actual size of the handwriting input that was provided) to thus at least substantially match the heights and widths of characters of the representation 602 based on e.g. average (e.g. median) heights and widths of the characters of the representation 602 as shown in FIG. 6.

Even further, though not shown owing to the black and white coloring of FIGS. 6-8, it is to be understood that the representation 602 as shown in FIG. 6 has been presented in a first color (e.g. green) per a user request and/or user setting for color of presentation of representations on the UI 600, and/or a user request and/or user setting for the example note taking application itself. It is to also be understood that the representation 702 as shown in FIG. 7 is presented in a second color different from the first color (e.g. blue) per a user request and/or user setting for color of presentation of representations on the UI 700, and/or a user request and/or user setting for the example canvass and/or drawing application itself. It is to also be understood the representation 702 as shown in FIG. 8 as being inserted into the UI 600 has thus changed color to the first color so that it matches the rest of the handwriting representations shown on the UI 600 rather than the first color as it was presented on the UI 700.

Figure 9:
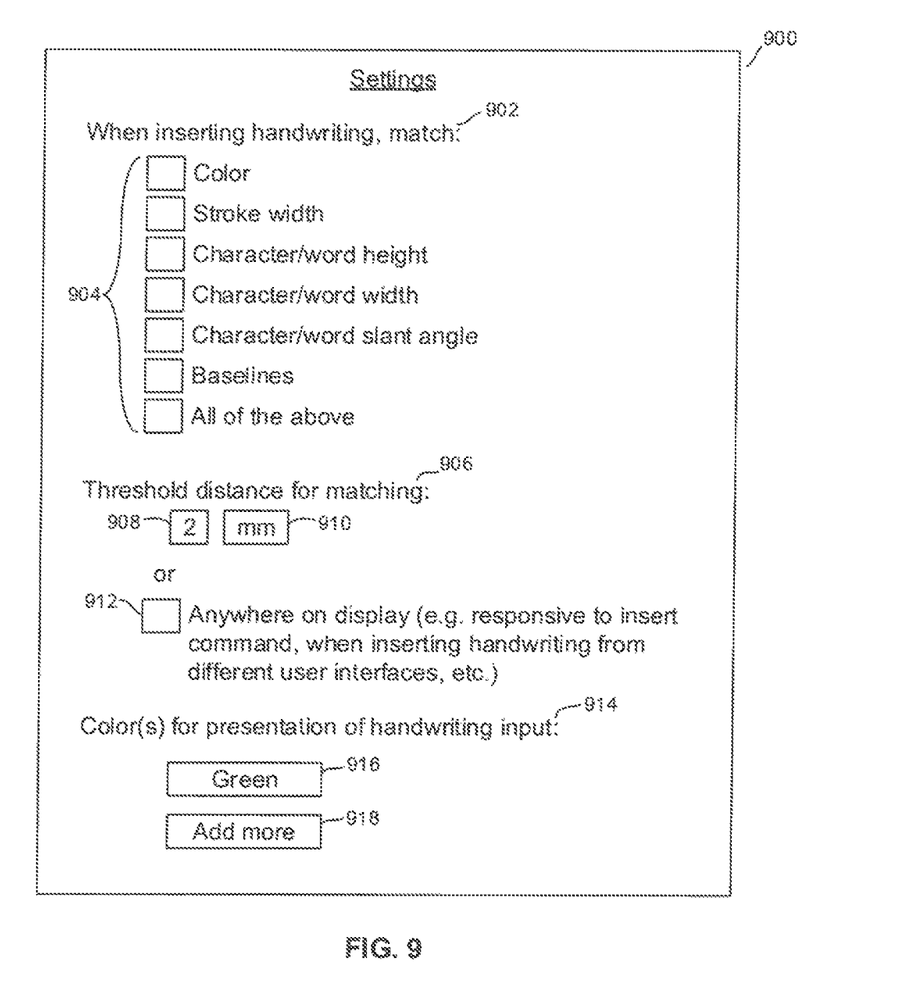

Continuing the detailed description in reference to FIG. 9, it shows an example UI 900 that may be presented on the display of a device undertaking present principles for configuring one or more settings of one or more applications which themselves are configured to undertake present principles. A first setting 902 is shown which pertains to one or more characteristics of first representations of handwriting input for a user to select for which second representations may be matched by the device when inserting the second representations of handwriting input adjacent to the first representations in accordance with present principles. Accordingly, check boxes 904 are shown which are selectable by a user and respectively associated with a different characteristic. Selecting (e.g. checking) a respective checkbox configures the device to match a respective characteristic associated with the check box when inserting a representation of handwriting input into another representation, while de-selecting a respective checkbox configures the device to not do so. In any case, it may be appreciated from FIG. 9 that characteristics that may be selected for matching on the example UI 900 include color, stroke width, character and/or word height, character and/or word width, and/or character and/or word slant angle, and baseline(s). Also note that one of the check boxes 904 pertains to an all of the above setting, and if the box associated with the all of the above setting is selected, the device will automatically check all other respective boxes 904 that are presented on the UI 900 and configure itself to match representations per all associated characteristics in accordance with present principles.

Still describing the UI 900, it also includes a second setting 906 for a user to establish a threshold distance (e.g. on a display and/or UI) for which a representation when inserted at a location in accordance with present principles may be determined based on the threshold distance to be at least adjacent to another representation with which at least one characteristic should be matched (e.g. adjacent in this example embodiment being at or within the threshold distance). Thus, a numerical entry box 908 is presented on the UI 900 which is manipulable by a user to enter a particular number, and an increment entry box 910 is shown which is manipulable by a user to select a particular increment to be associated with the number, such a e.g. millimeters, centimeters, inches, feet, pixels of the display, etc. For example, selection of the box 910 may cause a drop down menu of various increments to be displayed, where those increments may be selected and then presented in the box 910. It may be appreciated from FIG. 9 that in the present example, the threshold distance has been established to be two millimeters. Furthermore, note that the setting 906 also includes a check box 912 selectable by a user to configure the device to establish the threshold distance to be any location on the display (and/or, in some examples, any location on a particular UI and/or application presentation) e.g. responsive to receipt of an insertion command and/or when inserting handwriting from a different display, UI, and/or application. Thus, when the check box 912 is selected, the boxes 908 and 910 need not be manipulated by a user and/or have user input entered thereto to establish the threshold distance.

Still in reference to FIG. 9, a third setting 914 is also shown in the UI 900 pertaining to one or more colors in which representations of handwriting input (e.g. ones already presented, and/or ones being inserted) may be presented per a user's preference. Thus, a color entry box 916 is shown which is manipulable by a user to enter a desired color (e.g. by typing the color into the box 916, and/or based on selection of the box 916 which may cause a drop down menu of various colors to be presented from which a user may select one). Also note that an add more selector element 918 is shown which is selectable to automatically without further user input responsive thereto cause another box similar to the box 916 in function and configuration to be presented from which a user may select a second color for presentation of representations in plural colors (e.g. alternating colors for consecutive characters and/or words).

Without reference to any particular figure, it is to be understood that representations of e.g. words, individual characters (e.g. letters and numbers), and/or the characteristics thereof (e.g. stroke widths, heights, widths, and/or slant angles) that have been described herein can be identified (e.g. distinguished amongst each other) by software executed and/or stored on the device presenting the UI(s), and/or executed and stored remotely (e.g. cloud storage).

Also without reference to any particular figure but providing another example, e.g. for identifying a width of a particular character that is presented on a display and/or a particular character received as handwriting input at the display, a device undertaking present principles identifies a number of pixels in a horizontal dimension of the display including and between left-most and right-most pixels presenting the representation of the character and/or including and between left-most and right-most pixels under the outer surface of the display to which the handwriting input was directed. Accordingly, to determine an average character width of plural characters, in this example the number of pixels in a horizontal dimension for each character of the plural characters may be determined as set forth above, and then an average of those numbers (e.g. a mean, median, and/or mode) may be calculated to thus determine the average width of the characters.

It may now be appreciated that present principles provide for method, devices, and/or apparatuses to automatically adjust a representation of a user's handwritten stroke attributes, such as size and color, based on layout information when pasted somewhere else. For example, a given collection of strokes can be recognized and organized into a layout or a set of layouts, such as a paragraph with two lines, with each line having five words. When new strokes are pasted or moved into such a layout from somewhere else, the new strokes' (e.g. overall) size when pasted can be adjusted to the average (e.g. bounding) size of the strokes and/or words in the layout already, and the strokes' position can also be adjusted based on the existing baseline of the text line established by the two lines.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a transitory signal and/or a signal per se.

While the particular PRESENTATION OF REPRESENTATION OF HANDWRITING INPUT ON DISPLAY is herein shown and described in detail, it is to be understood that the subject matter which is encompassed by the present application is limited only by the claims.

What is claimed is:

1. A device, comprising:
    at least one processor;
    a touch-enabled display accessible to the at least one processor; and
    storage accessible to the at least one processor and bearing instructions executable by the at least one processor to:
    present, on the touch-enabled display at a first location, a first representation of at least a portion of first hand-based input;
    identify at least a first characteristic related to the first hand-based input;
    receive first input pertaining to second hand-based input;
    in response to receipt of the first input, present, on the touch-enabled display at a second location, a second representation of at least a portion of the second hand-based input;
    receive second input to present at least the portion of the second representation at least adjacent to the first location;
    in response to receipt of the second input and based on a determination that the second hand-based input comprises at least one character, present at least the portion of the second representation at least adjacent to the first location using the first characteristic; and based on a determination that the second hand-based input does not comprise at least one character, present at least the portion of the second representation at least adjacent to the first location but not using the first characteristic.

2. The device of claim 1, wherein the first input comprises the second hand-based input.

3. The device of claim 1, wherein the second input is input to present at least the portion of the second representation at a second location, the second location being specified via the second input.

4. The device of claim 1, wherein the first characteristic pertains to a stroke width of at least one character in the first representation.

5. The device of claim 1, wherein the first characteristic pertains to a slant angle of at least one character in the first representation.

6. The device of claim 1, wherein the first characteristic comprises at least one color in which the first representation is presented such that, at the second location and prior to presentation of at least the portion of the second representation at least adjacent to the first location using the first characteristic, the portion of the second representation is presented in a first color different from a second color in which the portion of the second representation is presented adjacent to the first location.

7. The device of claim 1, wherein the first characteristic comprises one or more of: mean stroke width of the first hand-based input as received at the touch-enabled display, median stroke width of the first hand-based input as received at the touch-enabled display, mode stroke width of the first hand-based input as received at the touch-enabled display, mean stroke width of the first representation, median stroke width of the first representation, mode stroke width of the first representation, mean height of the first hand-based input as received at the touch-enabled display, median height of the first hand-based input as received at the touch-enabled display, mode height of the first hand-based input as received at the touch-enabled display, mean height of the first representation, median height of the first representation, mode height of the first representation, mean width of the first hand-based input as received at the touch-enabled display, median width of the first hand-based input as received at the touch-enabled display, mode width of the first hand-based input as received at the touch-enabled display, mean width of the first representation, median width of the first representation, and mode width of the first representation.

8. The device of claim 1, wherein at least adjacent to the first location comprises one or more of: above the first location, below the first location, to a side of the first location, at at least a portion of the first location, and within a threshold distance of the first location.

9. The device of claim 1, wherein a first user interface (UI) associated with a first application at least in part establishes the first location, and wherein a second UI different from the first UI at least in part establishes the second location, the second UI associated with a second application different from the first application.

10. The device of claim 1, wherein the instructions are executable by the at least one processor to:
execute character recognition to determine whether the second hand-based input comprises a least one character.

11. The device of claim 1, wherein the determination that the second hand-based input does not comprise at least one character is based at least in part on the second hand-based input comprising a drawing.

12. The device of claim 1, wherein the at least one character is selected from the group consisting of: an alphabetical character, a numerical character, a symbol character.

13. A method, comprising:
presenting, in a first instance, a first representation of first hand-based input on a display;
presenting a second representation of second hand-based input on the display;
receiving a first command selecting at least a portion of the first representation;
receiving a second command to present at least the portion of the first representation at an area on the display at least adjacent to presentation of the second representation;
based on a determination that at least the portion of the first representation comprises at least one character, presenting, in a second instance, at least the portion of the first representation at the area differently in at least one aspect than at least the portion of the first representation was presented in the first instance at least in part by altering at least one aspect of presentation of at least the portion of the first representation based on the presentation of the second representation; and
based on a determination that at least the portion of the first representation does not comprise at least one character, presenting, in the second instance, at least the portion of the first representation at the area but not altering at least one aspect of presentation of at least the portion of the first representation based on the presentation of the second representation.

14. The method of claim 13, wherein the altering the at least one aspect of presentation of at least the portion of the first representation based on the presentation of the second representation comprises altering a slant angle of at least the portion of the first representation based on a slant angle of the second representation.

15. The method of claim 13, wherein the area at least adjacent to presentation of the second representation is a region that is at least within a threshold distance of the second representation.

16. The method of claim 13, comprising:
executing text recognition to determine whether at least the portion of the first representation comprises at least one character.

17. The method of claim 13, wherein the at least one character is selected from the group consisting of: an alphabetical character, a numerical character, a symbol character.

18. The method of claim 13, wherein the determination that at least the portion of the first representation does not comprise at least one character is based at least in part on the at least the portion of the first representation comprising a drawing of something other than a character.

19. An apparatus, comprising:
a first processor;
a network adapter;
storage bearing instructions executable by a second processor for:
presenting at least a first representation of hand-based input on a display and presenting at least a second representation of hand-based input on the display;
receiving a command to insert at least a portion of the second representation of hand-based input into a portion of the first representation;

based on the command and a determination that the second representation comprises at least one character, inserting at least the portion of the second representation into the portion of the first representation and adjusting the portion of the second representation to appear at least similar to the appearance of the first representation in at least one respect; and based on the command and a determination that the second representation does not comprise at least one character, inserting at least the portion of the second representation into the portion of the first representation but declining to adjust the portion of the second representation to appear at least similar to the appearance of the first representation in at least one respect;

wherein the first processor transfers the instructions over a network via the network adapter.

20. The apparatus of claim 19, wherein at least the portion of the second representation is adjusted to appear at least similar to the appearance of the first representation with respect to at least one slant angle of the first representation.

* * * * *